Nov. 12, 1968  H. B. FEHLMANN  3,410,426
TELESCOPIC LINK PARKING DEVICE
Filed Oct. 15, 1964  3 Sheets-Sheet 1
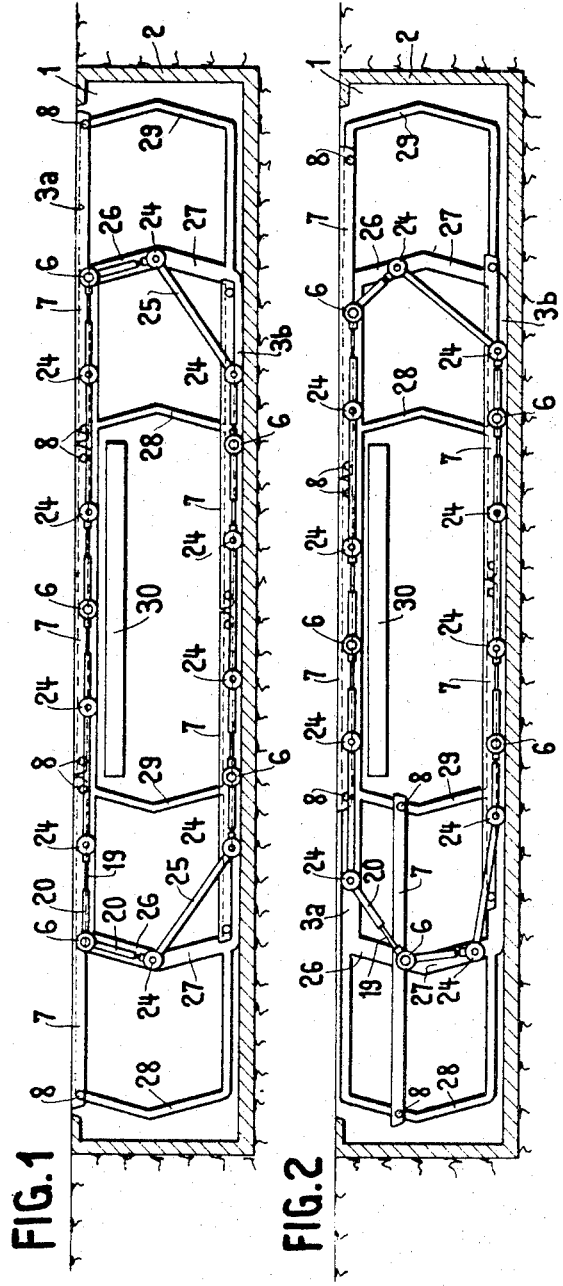
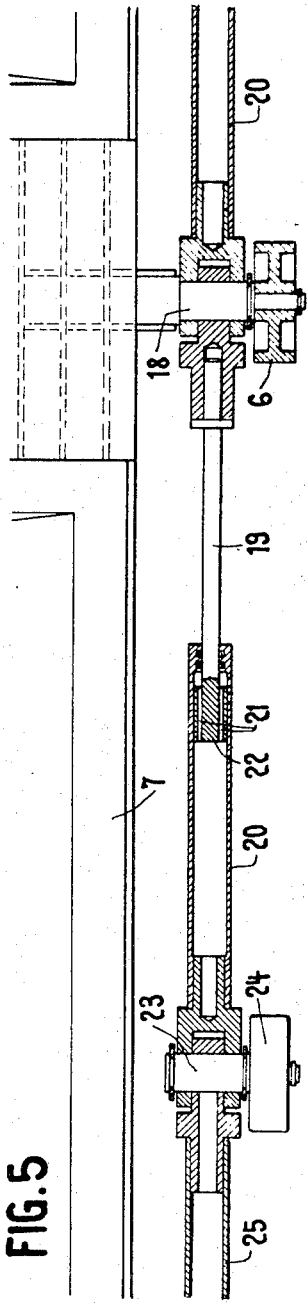
INVENTOR
Hans Beat Fehlmann
BY
ATTORNEYS

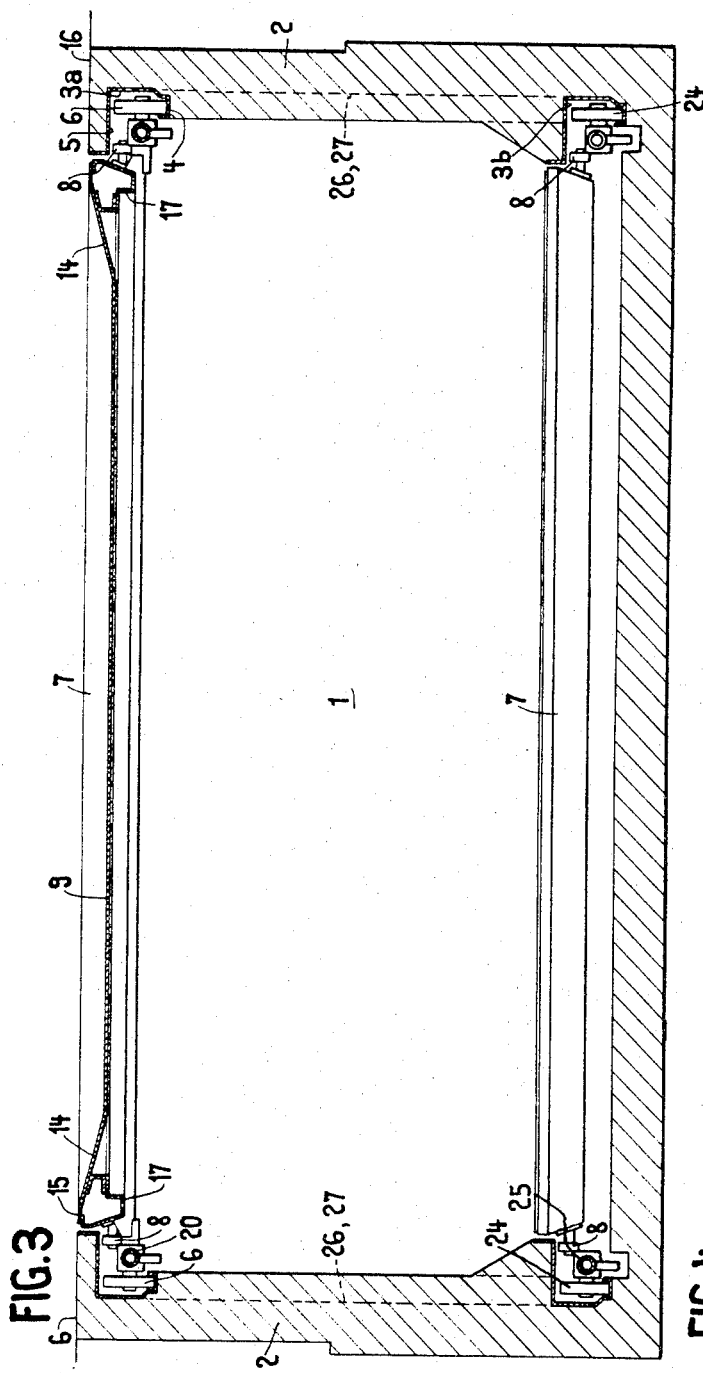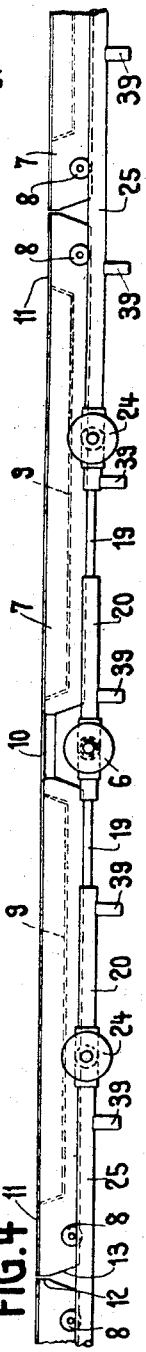

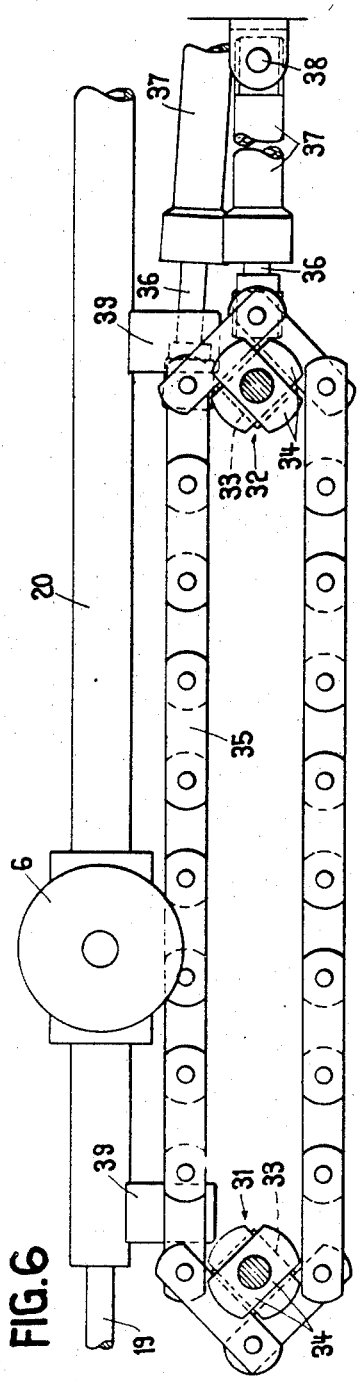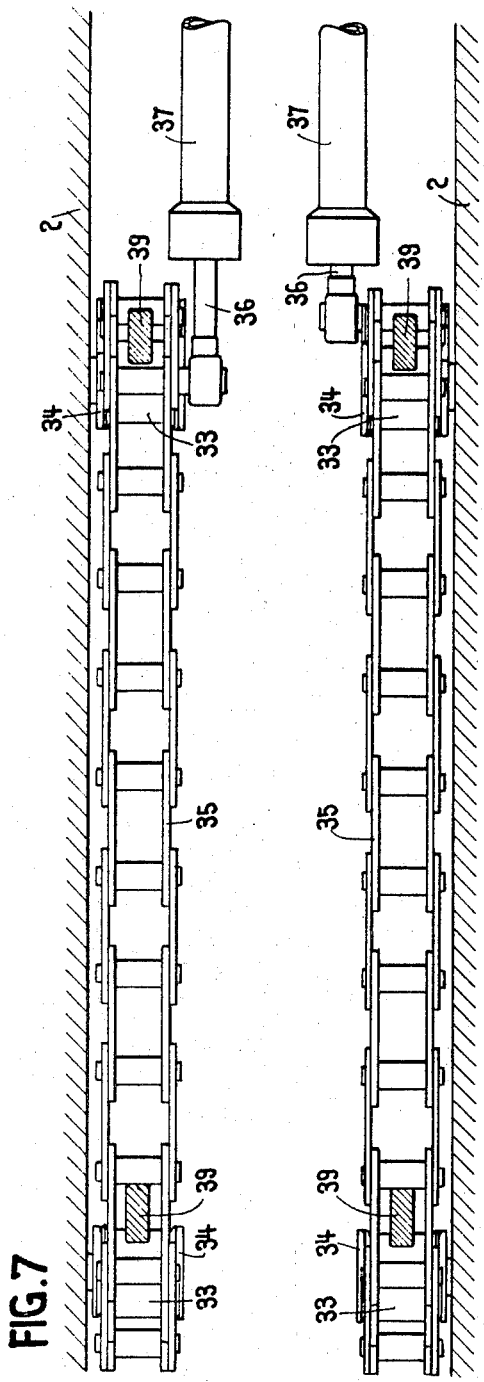

United States Patent Office 3,410,426
Patented Nov. 12, 1968

3,410,426
TELESCOPIC LINK PARKING DEVICE
Hans Beat Fehlmann, Zurich, Switzerland, assignor to
Mobile Parking S.A., Geneva, Switzerland
Filed Oct. 15, 1964, Ser. No. 404,115
Claims priority, application Austria, Oct. 16, 1963,
A 8,302, A 8,303, A 8,304
15 Claims. (Cl. 214—16.1)

ABSTRACT OF THE DISCLOSURE

A storing device, particularly a parking device or garage for vehicles, having platforms mounted on an endless chain of links guided along an endless guideway, means for advancing said platforms and chain respectively, said chain comprising telescoping rods constituted by a piston and cylinder containing fluid.

This invention relates to a storing device, especially a parking device or garage for vehicles, comprising carriers, for instance platforms for taking up the goods to be stored, link rods hinged to each other and to said carriers to form an endless articulated chain, endless guiding way means having substantially parallel and straight storing sections and return sections interconnecting said storing sections, said articulated chain being guided in said guiding way means.

Storing devices of this type, particularly parking devices comprising compartments adapted to take up motor vehicles are known. One particular advantage of such storing or parking devices resides in their high simplicity and reliability, these properties being due to the interconnection of the carriers by means of simple link rods. One difficulty of prior art storage devices of the above type when using rigid link rods arises at the return sections of the guiding way, because jamming and undesirably high stresses may occur due to differences in the moving speed of the carriers through the curved return bows or sections. It is therefore necessary to provide return bows or sections having a relatively large radius of curvature. As a consequence, the utilisation of the available space is relatively bad, because the diameter of the return bows or sections must exceed the distance between adjacent parallel storing sections of the guiding way. The shape of the return bows or sections is relatively complicated in order to avoid as much as possible speed differences between succeeding carriers moving through the return sections. The distance between succeeding carriers has to be chosen relatively high in order to avoid collision of adjacent carriers.

Attempts have been made to reduce or partially avoid the above drawbacks by allowing a limited expansion or compression of the chain. In one case the joints of the chain links are guided in the said guiding way means with some clearance so that the link rods are allowed to take a slightly inclined position in the guideway means when pressure stresses are transmitted through the chain, whereby the chain is slightly shortened. In another case the toggle links are interconnected by joint bolts extending through oblong holes at the ends of the link rods whereby a limited change in length of the chain is possible. However, in order to obtain smooth advance of the carriers without shocks and impacts the expansibility of the chain must be kept within limits not allowing to avoid the large return bows or sections referred to above.

This invention aims at removing all the above drawbacks and difficulties of prior storing and parking devices.

It is a first object of this invention to provide return sections arranged substantially at right angles to the said storing sections, whereby the moving direction and speed of carriers suddenly changes when such carriers pass from one of said storing sections into one of said return sections or vice versa. It is thus possible to avoid the above space consuming return bows of complicated shape. Due to the high acceleration of the carriers entering into the return sections, such carriers are rapidly displaced out of the path of following carriers moving along the storing section of the guiding way. The return sections may be of simple form, and they preferably comprise two straight portions including an obtuse angle between each other. There is no need for the dimensions of the return sections to exceed the distance between adjacent parallel storing sections of the guiding way.

It is a further object of this invention to provide means allowing a particularly high expansion or contraction of the chain, and this feature may preferably be used in combination with the above novel features of the guiding way. To this end, telescoping rods expansible and contractable by overcoming a considerable braking force may be used as link rods of the chain. Under these circumstances a particularly advantageous and simple shape of the guiding way and of the advance of the carriers through the guiding way is feasible. The carriers of prior storing or parking devices of the above type are pivotably suspended on the chain so that the storing device requires more space than required for the guiding way because the guiding way has to be arranged above the storing space through which the suspended carriers are displaced. In a parking device the guiding way has to be arranged above the drive to the parking site. It is a further object of this invention to remove this difficulty by providing carriers supported and guided and interconnected with the link rods of the chain below the resulting gravity center of such carriers and their load. It is thus possible to provide carriers in the form of flat platforms located substantially in the plane of the guiding way, whereby a further reduction of the overall space requirement for the storing device is possible.

The attached drawings illustrate, by way of example, one embodiment of a parking device for motor vehicles according to this invention.

FIGS. 1 and 2 are schematic side views of the device, partially in section and illustrating different positions of the chain of the device, FIG. 3 is a cross-section of the device, FIG. 4 is a side view of a part of the device on larger scale, FIG. 5 is a longitudinal section of a part of the chain on larger scale, FIG. 6 is a side view of the driving mechanism, and FIG. 7 is a top view of the driving mechanism.

The illustrated parking device is located in a pit 1 having a concrete lining 2. Pairs of similar parallel straight guide profiles 3a and 3b are inserted into the side walls of the concrete lining 2. The guiding profiles comprise a lower leg 4 and an upper leg 5 projecting inwardly from the lower leg 4. The lower legs 4 form a guiding rail for supporting or carrying rollers 6, pairs of such rollers being pivoted in the middle and at the lower end of the sides of tray-shaped platforms 7. Pairs of auxiliary guiding or safety rollers 8 are pivoted at the ends of the carriers 7, such auxiliary guiding rollers 8 engaging below the outer ends of legs 5 of profiles 3 as shown in FIG. 3. Therefore, although the platforms 7 are supported by a single pair of supporting rollers 6 in their center portion and below their gravity center, such platforms cannot tilt, because any tilting movement is prevented or limited by engagement of the guiding rollers 8 with the profile legs 5. Of course the clearance between the guiding rollers 8 and the legs 5 should be as small as practically possible, this clearance being slightly exaggerated in FIG. 3.

The platforms 7 are tray-shaped and comprise upper rim portions and two tray-shaped loading surfaces 9 extending transversally to the moving direction of the platforms. An elevated partition 10 separates the loading trays 9 and such trays are spaced from the ends of the platform by elevated surfaces 11. At the ends of the platforms 7 outer abutting surfaces 12 of limited height are formed and the end walls 13 are recessed relatively to the surfaces 12. Ramps 14 (FIG. 3) are formed at the sides of each loading tray 9. The side rims 15 of the platforms are flush with the drive or ground 16. The pivot shafts of the supporting rollers 6 are interconnected with stiffening profiles 17 of the platforms 7.

The pivot shafts of the supporting rollers 6 of each platform also form the joint bolts 18 of pairs of adjacent telescoping rods located at the side of the platforms. Each telescoping rod comprises a piston rod displaceable in a cylinder 20 and carrying a piston 22 provided with fluid exchange bores 21 of small cross section and high flow resistance. The cylinder is filled with a fluid, preferably oil, this fluid allowing displacement of the piston 22 in the cylinder only by overcoming a considerable resistance or braking force which is predetermined by the fluid exchange bores 21. The cylinder 20 of the one telescoping rod is pivoted on the joint bolt 18 while the cylinder 20 of the opposite telescoping rod shown at the left in FIG. 5 is pivoted on another joint bolt 23 whereon another guiding roller 24 of the same diameter as the supporting rollers 6 is pivoted.

As shown in FIGS. 1 and 2, groups of the telescoping rods 19, 20 and of rigid link rods 25 pivoted on the joint bolts 23 are inserted between the supporting rollers 6 and joint bolts 18 respectively of succeeding platforms 7. In other language, groups of three link rods whereof the toggle rods adjacent to the rollers 6 may be expanded or contracted by overcoming a predetermined braking force, such as two joints 23 with guiding rollers 24 are inserted between the rollers 6 of succeeding platforms 7. The guiding rollers 24 are in the same vertical plane as the supporting rollers 6 and therefore are guided in the same manner as the supporting rollers 6 between legs 4 and 5 of the profiles 3.

The ends of the straight guiding profiles 3a and 3b are interconnected with pairs of guiding profile portions 26 and 27 enclosing an obtuse angle between each other and with the profiles 3a and 3b respectively. Profile portions 26 and 27 form return sections of the endless guideway of the device and are disposed in the plane of motion of rollers 6 and 24 so that only such rollers are guided by the return sections 26 and 27. The portions 26 and 27 are inclined relatively to the vertical direction by 5 to 20° and they form an angle of 95 to 110° with the profiles 3 forming the horizontal storing sections of the endless guiding way. In spite of the slightly obtuse angles enclosed between the return sections 26 and 27 and the profiles 3a, 3b, the return sections 26 and 27 extend substantially at right angles or transversely to the profiles 3a and 3b. Auxiliary U-shaped guiding profiles 28 and 29 are provided parallel to the return sections 26, 27 at a distance corresponding to the distance between supporting rollers 6 and auxiliary guiding rollers 8 of the platforms 7. The guiding ways 28 and 29 are located in the same vertical plane with rollers 8 so that only the rollers 8 will enter into such auxiliary guiding ways. In the embodiment the endless closed guiding way forms an elongated hexagon, but any other elongated polygon or any other shape may be used.

Below and inside the guiding profiles 3a driving mechanisms 30 are located as schematically shown in FIGS. 1 and 2, such driving mechanisms being illustrated in detail in FIGS. 6 and 7. Return sprocket wheels 31 and 32, having each a core 33 of square cross section and guiding flanges 34 at each side are pivoted on shafts fixed at the side walls of the concrete lining 2 of the pit. An endless chain 35 is mounted on each pair of return and driving sprockets 31 and 32. One axially extending joint bolt of each chain 35 is pivotably connected to a piston rod 36 of driving cylinder 37. As shown in FIG. 6 the ends of cylinder 37 opposite to the piston rods 36 are pivoted on bolts 38 fixed at the side walls of the concrete lining of the pit. As shown in FIGS. 4 and 6 the link rods disposed in the same vertical plane with the chains 35 have downwardly extending lugs or teeth 39 engaging the upper side of chain 35. The distance between succeeding teeth 39 is less than the length of the upper side of the chain 35 so that at least one tooth 39 engages the chain for all possible positions of the device. As shown in FIG. 6 the joint bolts coupled with the piston rods 36 are shifted by one chain link or by an angle of 90° on the sprocket wheels 31 and 32. Therefore, one of the pistons will always be able to drive one of the chains 35 and the carriers of the storing device when the other piston is in its dead center position.

FIG. 1 shows the parking device in one of its rest positions wherein three platforms 7 are in the upper horizontal storing section thereby forming a covering in the opening of the pit 1, whereas two of the platforms 7 are in the lower storing section in a position symmetrical to the upper three platforms. Vehicles not shown in the drawings may be parked on platforms 7, the parking place of each vehicle being determined by one tray-shaped loading recess 9 of the platforms. Further vehicles may drive from any desired side over the one ramp 14 onto free places of the upper platforms. The trays 9 of the platforms allow to keep the gravity center of loaded platforms as low as possible and to prevent undesired displacement of the vehicles on the platforms. Due to the rim portions 11 and to the partitions 10 all vehicles are maintained at a minimum distance from each other and each vehicle is readily accessible for driving it off the platform. The distance between adjacent vehicles is sufficient for preventing collision between two vehicles or between vehicles and platforms when the platforms are displaced as explained hereinafter.

When all available parking recesses 9 of the upper platforms 7 are occupied or when a vehicle stored on one of the lower platforms 7 is required for driving it away, the chain comprising the platforms and link rods has to be rotated in order to displace the desired platform into the upper storing section. To this end chains 35 may be driven by means of the driving cylinders 37 in a manner usual per se in piston motors or vapour engines, by automatic control of the oil inlet and outlet to and from the cylinders 37, whereby the platforms and link rods interconnecting them are driven by the teeth 39 engaging the chains 35.

As shown in FIGS. 1, 2 and 4 the platforms 7 abut against each other with their end surfaces 12 in the horizontal storing sections whereby the relative position of the platforms is determined. For this relative position of the platforms the extensible and compressible links or telescoping rods interconnecting such platforms are practically fully extended. This is schematically illustrated in FIGS. 1, 2 and 4 by the piston rods 19 shown in their outer end position. The chain and the form of the guiding way are so adjusted that for the rest position shown in FIG. 1 the extensible and compressible telescoping rods interconnecting succeeding platforms located in different horizontal storing sections are completely compressed.

Assuming that the driving mechanisms 30 rotate the platforms 7 in anticlockwise direction through the endless guiding way, the upper outer left platform 7 illustrated in FIG. 1, of which the supporting rollers 6 are near the beginning of the return section 26, 27, will immediately move downwardly because its supporting rollers 6 move downwardly through the upper portion 26 of the return section of the guiding way whereas its rollers 8 enter into the auxiliary guiding ways 28. Due to the sudden deflection or change of the moving direction the upper left platform 7 will sink more rapidly than the next (middle) platform may follow through the upper storing section. The lower left platform shown in FIG. 1 will be moved to the right at a relatively high speed due to the motion of the chain, whereby the lower right platform is displaced in the same direction and at the same speed. This position of the chain is shown in FIG. 2 from which it is seen that the one platform 7 has already moved downwardly through the left-hand return section by a considerable amount while the next upper platform has been displaced to the left by a comparatively small distance. A new position will thus be reached which is symmetrical to the position shown in FIG. 1, and wherein three platforms are in the lower storing section whereas two platforms are in the upper section. Differences in the speed of succeeding platforms are taken up by the extensible and compressible links of the chain so that no excessive stresses and no jamming will occur. In spite of the extensibility and compressibility of the telescoping rods 19, 20 practically no free relative displacement of platforms occurs, because the telescoping rods may only be compressed or extended by considerable forces. It is thus impossible that platforms rapidly fall through the return sections and are stopped at the lower end thereof by shocklike deceleration.

The platforms cannot tilt when moving through the return sections of the guiding way. By any tilting movement of the platforms the auxiliary guiding rollers 8 engage the slightly inclined surfaces of the auxiliary guiding ways 28 and 29, thereby limiting the tilting movement. The slight inclination of the portions of the return sections has the particular advantage of limiting the possible tilting angle of the platforms to a very small value even at relatively small accuracy of the guiding ways and guiding and supporting rollers. However, it is also feasible to provide substantially straight, vertically extending return sections interconnected with the horizontal storing sections by narrow interconnected bows.

The embodiment of this invention described above is particularly simple in that the same guiding way may be used for the supporting rollers 6 and for the guiding rollers 24. However it is possible and may be desirable to provide separate guiding ways for rollers 6 and 24 respectively, particularly in the return sections of the guiding way, whereby the rollers 6 and 24 would have to be located in different vertical planes.

In order to obtain positive movement and advance of the supporting and guiding rollers 6 and 24 in all places of the guiding way, the straight portions of the guiding way have to be interconnected by bows. However, the radius of curvature of such bows may be much smaller than the radius of curvature of the prior devices described above, and this radius of curvature may be much smaller than half the distance between the lower and upper storing section. Displacement of the platforms through the return sections always occurs alternatively, that is, only one platform moves through a return section at a time. One advancing cycle of the device always comprises at least lowering of one platform and lifting of another platform so that three platforms completely covering the pit 1 are in the upper storing section as shown in FIG. 1 at the end of any displacement of the platforms. The advancing cycles of the platforms may be controlled by hand or automatically.

It may be desirable to provide telescoping rods 19, 20 having especially suitable characteristics. The telescoping rods shown in the embodiment are completely filled with oil when the pistons are fully inserted into the cylinders. A vacuum is thus produced at the rear side of the pistons when the rods are extended. Therefore, compression of the rods will first take place at a low resistance until the vacuum previously produced is filled, this characteristic of the rods being desirable. However, the rods may be equipped with flow-control valves or the like for obtaining extension at lower resistance than compression, or resistance varying according to a predetermined characteristic or function, or constant braking force.

Since the platforms of the illustrated device are supported and guided below their center of gravity no structure raising above the upper platforms is required. With prior parking devices of this type it was usual to suspend the platforms or compartments above their center of gravity so that the guiding way of the device had to be located above the drive or ground, this needing structure above ground level. Structure of this kind may completely be avoided with the parking device according to this invention, but it would be possible to use closed compartments instead of platforms or to provide a roof above the parking device. On the other hand, the device may also be used in buildings. The storing sections of the device may be made of any desired length whereby more than three carriers may be stored in one section. More than two floors or storeys may be provided.

While each platform of the embodiment described with reference to the drawings has two supporting rollers in its center, the guiding rollers 8 may be used as supporting rollers and the supporting rollers 6 may be used as guiding rollers or the rollers 6 may be omitted. In the latter case the front and rear rollers 8 of each platform must be located in different vertical planes and separate return sections somewhat similar to guiding ways 28 and 29 for such rollers must be provided in different planes.

The driving mechanisms may be arranged in a different way and other driving mechanisms may be used. As an example they may transmit their motion directly to the platform 7 or the motion may partially be transmitted to the platforms and partially to the link rods. The driving mechanisms may comprise usual motors controlled by suitable circuits. Power may be transmitted to the storing chain in the return sections, particularly when straight vertical return sections are used.

Instead of horizontal storing sections, inclined storing sections may be provided in order to utilize space available on a slope of a hill. In this case the supporting and guiding rollers may be arranged in such a manner that the loading surfaces of the carriers are horizontal in spite of the inclined guiding way.

What I claim is:

1. A storing device, especially a parking device or garage for vehicles, comprising carriers for taking up the goods to be stored, telescoping link rods hinged to each other and to said carriers to form an endless articulated chain, said telescoping link rods including braking means other than normal friction for continuously opposing their telescoping action, endless guiding way means having substantially parallel and straight storing sections and return sections interconnecting said storing sections, said articulated chain being guided in said guiding way means, said return sections having straight portions arranged substantially transversely to the said storing sections, whereby the moving direction and speed of carriers suddenly changes under expansion or contraction of said link rods when such carriers pass from one of said storing sections into one of said return sections or vice versa.

2. A device according to claim 1, comprising a number of link rods between succeeding carriers, the joints of such link rods being guided in a guide way.

3. A device according to claim 1, comprising a guide way having the shape of an elongated polygon and formed by two parallel storing sections and two return sections interconnecting the ends of the storing sections.

4. A device according to claim 3, said return sections comprising two straight portions enclosing an obtuse angle between each other and an angle in the order of 95 to 110° with adjacent storing sections.

5. A device according to claim 1, wherein the said carriers comprises a carrying roller at each side thereof in the middle of the carrier and pairs of auxiliary guiding rollers near opposite ends of the carrier, the said guide way means comprising a first guiding track adapted to be engaged by said carrying rollers and a second guiding track adapted to be continuously engaged by each of said auxiliary guide rollers.

6. A device accordng to claim 5, wherein the guiding way means are subdivided into three parallel guide tracks in the said return sections, the distance between such parallel guide tracks being equal to the distance between adjacent rollers of each carrier.

7. A device according to claim 6, wherein the said parallel guide tracks in said return sections comprise each two portions inclined relatively to the plane of the carriers and of the storing sections.

8. A device according to claim 5, wherein the carriers are adapted to take up vehicles, comprising an upper horizontal storing section, the side rims of carriers located in this upper storing section being flush with a drive.

9. A storing device, especially a parking device or garage for vehicles, comprising carriers for taking up the goods to be stored, telescoping link rods hinged to each other and to said carriers to form an endless articulated chain, endless guiding way means having substantially parallel and straight storing sections and return sections interconnecting said storing sections, said articulated chain being guided in said guiding way means, said link rods including braking means other than normal friction means for continuously opposing expansion or compression of said link rods.

10. A storing device, especially a parking device or garage for vehicles, comprising carriers for taking up the goods to be stored, telescoping link rods hinged to each other and to said carriers to form an endless articulated chain, said telescoping rods having a cylinder part filled with fluid and a piston part displaceable in said cylinder part and having fluid exchange apertures interconnecting opposite piston sides, endless guiding way means having substantially parallel and straight storing sections and return sections interconnecting said storing sections and said articulated chain being guided in said guiding way means.

11. A device according to claim 10, comprising groups of three toggle links interconnecting succeeding carriers, each group comprising a rigid middle toggle link and two outer expansible and contractible toggle links shorter than the middle toggle link.

12. A device according to claim 10, comprising storing sections of substantially equal length, and an odd number of carriers.

13. A device according to claim 10, comprising carriers abutting against each other in the storing sections and interconnected by rods substantially completely expanded between adjacent carriers located in a storing section.

14. A device according to claim 10, wherein the cylinder parts of the telescoping rods are completely filled with a liquid when the telescoping rods are completely compressed, that is, when the piston part is fully inserted into the cylinder part.

15. A device according to claim 10, wherein the said articulated chain, said endless guiding way means and driving means for said chain are located in a pit, whereby carriers located in an upper storing section of the guide way means are substantially at ground level and form a covering of the pit.

References Cited

UNITED STATES PATENTS

| 2,078,770 | 4/1937 | Morton | 214—16.1 |
| 2,339,494 | 1/1944 | Lubahn | 198—137 |
| 2,584,134 | 2/1952 | Knutson | 198—195 |
| 2,619,239 | 11/1952 | Hild et al. | 214—16.1 |
| 2,728,467 | 12/1955 | Glicker | 214—16.1 |
| 2,856,081 | 10/1958 | Zaha | 214—16.1 |
| 3,166,180 | 1/1965 | Sonderegger | 214—16.1 |

FOREIGN PATENTS

| 1,215,152 | 11/1959 | France. |
| 1,341,811 | 9/1963 | France. |
| 436,107 | 10/1926 | Germany. |
| 501,331 | 11/1954 | Italy. |
| 580,404 | 8/1958 | Italy. |
| 363,473 | 9/1962 | Switzerland. |

OTHER REFERENCES

A.P.C., March 1943, 352,164 Aasted.

HUGO O. SCHULZ, *Primary Examiner.*

R. B. JOHNSON, *Assistant Examiner.*